United States Patent [19]

Sleigh

[11] Patent Number: 4,698,909
[45] Date of Patent: Oct. 13, 1987

[54] FASTENER SPLITTER DEVICE

[75] Inventor: Rodney P. Sleigh, Accrington, England

[73] Assignee: Allspeeds Holding Limited, Lancashire, England

[21] Appl. No.: 829,596

[22] Filed: Feb. 13, 1986

[30] Foreign Application Priority Data

Feb. 14, 1985 [GB] United Kingdom ............... 8503777

[51] Int. Cl.4 ............................................ B26B 17/00
[52] U.S. Cl. ..................................... 30/180; 30/182; 30/272 R
[58] Field of Search ............... 30/124, 180, 182, 183, 30/184, 185, 189, 241, 272 R

[56] References Cited

U.S. PATENT DOCUMENTS

| 285,868 | 10/1883 | Amelotte | 30/184 |
| 1,156,745 | 10/1915 | Brady | 30/272 R |
| 3,992,777 | 11/1976 | Perkins et al. | 30/182 X |
| 4,246,699 | 1/1981 | Van Riper | 30/182 |
| 4,257,163 | 3/1981 | Bauer | 30/241 X |
| 4,285,126 | 8/1981 | Irwin | 30/182 X |

Primary Examiner—E. R. Kazenske
Assistant Examiner—Michael D. Folkerts
Attorney, Agent, or Firm—Seidel, Gonda, Goldhammer & Abbott

[57] ABSTRACT

A splitter device for splitting a nut or other fastener comprises a frame (20) guiding a cutter (30) for movement against a nut held by an abutment end portion (24) of the frame. The cutter has two spaced parallel blade edges (35) so that the fastener is split into two parts, from the same side.

15 Claims, 5 Drawing Figures

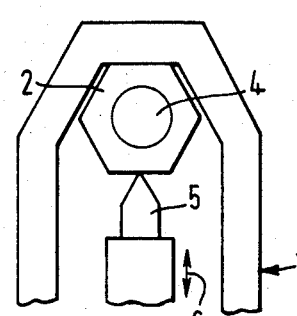
FIG. 1
PRIOR ART
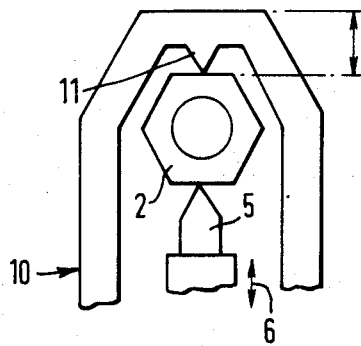
FIG. 3
PRIOR ART
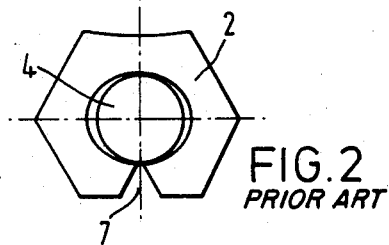
FIG. 2
PRIOR ART
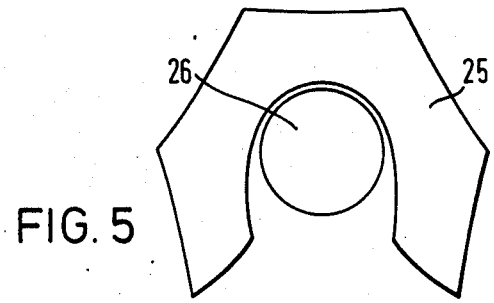
FIG. 5

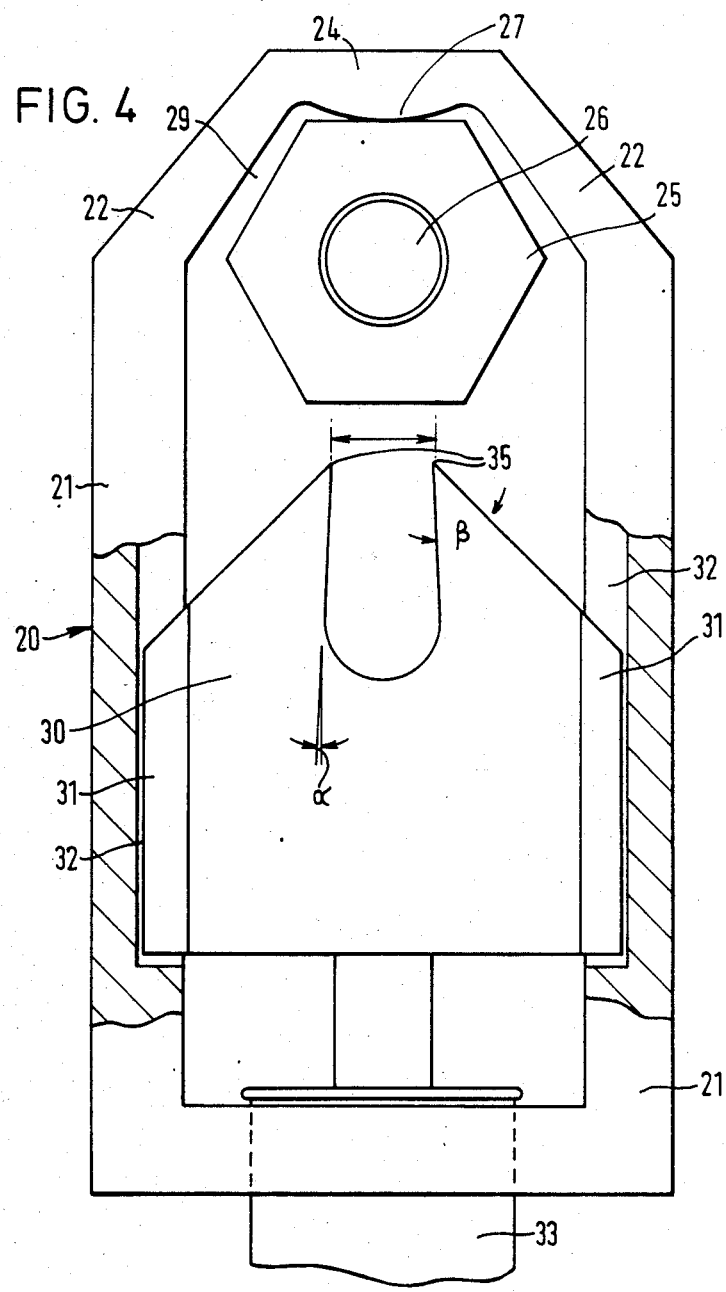

FASTENER SPLITTER DEVICE

FIELD OF THE INVENTION

The invention relates to a splitter device for splitting fasteners, in particular, nuts.

BACKGROUND OF THE INVENTION

Nuts have frequently to be removed from male threaded parts such as studs or bolts on which they have been placed, for example to allow equipment to be dismantled, and this is often difficult because the effects of corrosion make it impossible to turn the nut under the force that can be applied manually by a spanner. Nuts that cannot be released by ordinary means can be chiselled off by brute force or burnt off by oxy-acetylene torches but neither of these methods is to be recommended because of safety factors and the risk of damage. Instead, the nuts can be removed in a more controlled manner by use of a proprietary nut splitter tool or device.

The operation of such known splitter devices is described below with reference to FIGS. 1-3, prior art, of the accompanying drawings.

The device shown in FIG. 1 comprises a frame 1 with an interior in which can be received a screwthreaded nut 2 received on a stud or a bolt 4 provided with a mating external screw thread. A cutter blade 5 is guided by the frame for movement towards and away from the nut 2 as indicated by the arrow 6. To split the nut 2, the blade 5 is moved into cutting engagement with it, hydraulically or mechanically, in a linear manner, reacting against the frame 1.

It is a disadvantage of the device of FIG. 1 that it merely splits the nut 2 apart by a small amount, as shown at 7 in FIG. 2, and causes damage to the bolt 4. The nut 1 remains in situ on the bolt 4 and is distorted by the cutting operation so as to be no longer of a shape to suit regular spanners. The split nut 2 can be rotated through 180° and cut again, but the technique is less than satisfactory especially when work is being done under difficult conditions, for example in undersea locations.

This disadvantage can be overcome by use of the prior art nut splitter device of FIG. 3 which resembles that of FIG. 1 except that the frame 10 mounts a blade 11 opposing the movable cutter blade 5, so that the nut 2 is split into two equal portions. It is however a disadvantage of this device that substantial clearance is required on the far side of the nut 2 from the movable blade 5, in order to accommodate not only the frame 1 but also the fixed blade 11. Frequently, such clearance is not available.

The invention accordingly has as its object the provision of a fastener splitter device in which the above-mentioned disadvantages are avoided.

BRIEF DESCRIPTION OF THE DRAWINGS

FIG. 1 is a schematic partial plan view of a first prior art nut splitter.

FIG. 2 is a like view of a nut split by the device of FIG. 1.

FIG. 3 is a view resembling that of FIG. 1 of a second prior art nut splitter device.

FIG. 4 is a schematic plan view of the nut splitting device embodying the invention.

FIG. 5 is a like view of a nut split by the device of FIG. 4.

SUMMARY OF THE INVENTION

The invention accordingly provides a splitter tool or device comprising a cutter movable relative to an abutment to engage a fastener to be split, for example, a nut, held by the abutment, the cutter having blades positioned to engage the fastener at spaced-apart locations.

A device in accordance with the invention can thus cut the nut or other fastener at two positions which are spaced part but located on the same side of the nut, so that the nut is split into two unequal portions. The spacing of the two blades of the cutter can be such that the two parts of the split nut can readily be removed and there is no risk of damage to the stud or bolt.

The frame portion for backing the nut against the cutter blade can of course be of the minimum dimensions needed for strength adequate to resist the cutting force, so that no very great clearance is required on the side of the nut opposite the cutter. Moreover, the cutter can be shaped so as to force apart the larger portion of the nut remaining, so as to facilitate its removal.

DETAILED DESCRIPTION OF THE INVENTION

A splitter device in accordance with the invention is described below by way of example, with reference to FIGS. 4 and 5 of the accompanying drawings.

The illustrated nut splitter tool or device of the invention comprises a frame 20 having spaced parallel side portions 21 joined together at one end by inwardly inclined portions 22 and a transverse end portion 24, which defines with the portions 22 a space within the frame for the reception of a hexagonal nut 25 received on the threaded end of a bolt 26. The inner face of the end portion 24 is formed with a central convex projection 27 which functions as a fulcrum for the nut, and the portions 22 diverge from the end portion 22 at angles in excess of 60° to allow clearance, at 29, for distortion of the nut when split.

The device includes a cutter 30 guided by the side portions 21 for reciprocal movement between them towards and away from the end portion 24. For this purpose, the cutter 30 is provided with guide portions 31 extending into grooves 32 formed on the inner faces of the side portions. The cutter 30 is driven towards the frame end portion 24 under power supplied by a suitable drive arrangement for example a hydraulic cylinder 33 mounted at the other end of the frame as shown.

The cutter 30 has two spaced parallel blade edges 35 extending in use parallel to the axis of the nut 25 and in a plane perpendicular to the direction of movement of the cutter 30. The length of the blade edges 35 is at least the axial length of the nut and the edges are spaced apart by slightly less than the width of the end portion 24, so as to engage the nut adjacent the ends of the side face opposite the side face engaged by the frame end projection 27. The blade edges can be spaced apart by an amount slightly less than the diameter of the bolt 26. The cutter 30 has between the blade edges 35 a generally U-shaped recess the sides of which slightly diverge inwardly through a small back-off angle a of the order of 2°. Externally, the cutter 30 is flared outwardly from the blade edges through an angle b, normally in the range of from 20° to 45°.

In use, the frame 20 is placed over the nut 25 irremovably received on the bolt 26 in the position shown in FIG. 4, and the hydraulic cylinder 33 is operated to advance the cutter 30 to engage the blade edges 35 against the adjacent face of the nut. Continued movement of the cutter 30 effects cutting of the nut at two positions simultaneously, and, because of the external shape of the cutter 30, this acts to open the major portion of the nut so additionally applying a tensile stress to the weakening part of the nut. Eventually, the nut 25 fails in tension so that a segment 25A, as shown in FIG. 5, is separated from the rest of the nut, before the blade edges 35 reach the thread of the bolt 26, so that the thread is undamaged. The cutter 30 can now be withdrawn and the separated segment 25A of the nut in the recess of the cutter can be freed. Jamming of the segment 25A in the recess is prevented by the inward divergence of its side walls. The remainder of the nut 25 has been opened up, by distortion into the clearances 29, to such an extent that it is separated from the bolt and can readily be removed.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A splitter device for splitting a fastener received on a stud or bolt, the splitter device comprising:
    a frame having an opening therein for receiving the fastener to be split,
    an abutment portion of said frame providing an abutment face adapted to support without cutting one side of the fastener to be split,
    a cutter,
        means guiding said cutter for movement on said frame in a direction towards said abutment face to engage the other side of the fastener supported thereby,
        said cutter having two spaced parallel cutter edges and a recess between said cutter edges, each said cutter edge having a substantial extent in a plane perpendicular to said direction of cutter movement, and being orientated to extend substantially parallel to the axis of the fastener supported on said abutment face whereby said fastener is split by said two cutter edges along the axial direction thereof on a side thereof opposite said one side into two unequal parts, and the walls of said recess diverging away from said cutter edges to thereby prevent jamming in the recess of a split part of said fastener.

2. The splitter device of claim 1 wherein said walls diverge inwardly through an angle of approximately 2°.

3. The splitter device of claim 1 wherein said cutter has outer side walls diverging away from said cutter edges to thereby force open the split part of said fastener remaining on said stud or bolt.

4. The splitter device of claim 3 wherein said outer side walls diverge through an angle in the range of 20° to 45°.

5. The splitter device of claim 1 wherein said abutment face is convex to provide a fulcrum for said fastener.

6. The splitter device of claim 1 wherein said cutter edges are spaced apart by a distance slightly less than the width of said abutment face.

7. In combination, a nut received on a stud or bolt and a splitter device for splitting said nut to effect removal thereof from said stud or a bolt, said splitter device comprising a frame having an opening therein for receiving said nut to be split, an abutment portion of said frame providing an abutment face adapted to support without cutting one side of said nut, a cutter, means guiding said cutter for movement on said frame in a direction towards said abutment face to engage the other side of said nut supported thereby, said cutter having two spaced parallel cutter edges, and a recess between said cutter edges, each said cutter edge having a substantial extent in a plane perpendicular to said direction of cutter movement and being orientated to extend substantially parallel to the axis of said nut, whereby said nut is split by said two cutter edges along the axial direction thereof on a side thereof opposite said one side into two unequal parts, and wherein the walls of said recess diverge away from said cutter edges to thereby prevent jamming in the recess of a split part of said nut.

8. The combination of claim 7 wherein said nut is an hexagonal nut and wherein said frame comprises spaced parallel side portions slidably guiding said cutter and further portions connecting said abutment portion to said side portions, said further portions making an angle with said abutment portion in excess of 120°, to thereby provide clearance between said further frame portions and adjacent faces of said hexagonal nut.

9. The combination of claim 7 wherein said cutter edges are spaced apart by slightly less than the width of the face of said nut opposed to said cutter edges.

10. In combination, a fastener received on a stud or bolt, and a splitter device for splitting said fastener to effect removal thereof from said thud or bolt, said splitter device comprising:
    a frame defining an opening in which said fastener is received,
    a side of said frame providing an abutment for said fastener,
    a cutter for effecting said splitting of said fastener,
    guide means guiding said cutter on said frame for movement to engage said fastener on a side thereof opposite said abutment, and
    means for causing said movement of said cutter,
    wherein said cutter has two cutter edges extending substantially parallel to the axis of said stud or bolt, said cutter edges each having an extent axially of the stud or bolt at least equal to the axial thickness of said fastener,
    wherein said fastener is axially split into two unequal portions by said cutter edges on movement of said cutter towards said abutment.

11. The combination of claim 10 wherein said fastener comprises a nut and wherein said cutter edges are spaced apart slightly less than the width of a face of said nut.

12. The combination of claim 10 wherein said fastener comprises a nut and wherein said cutter edges are spaced apart by a distance approximating the diameter of the central aperture of said nut.

13. The combination of claim 10 wherein said cutter edges are shaped to deform the larger of said two unequal portions of said fastener on splitting to facilitate removal thereof.

14. The combination of claim 10 wherein said cutter has a recess between said cutter edges, the walls of said recess diverging away from said cutter edges to thereby prevent jamming in the recess of a split part of said fastener.

15. The combination of claim 10 wherein said cutter has outer side walls diverging away from said cutter edges to thereby force open the split part of said fastener remaining on said stud or bolt.

* * * * *